United States Patent [19]
Klonoski

[11] 3,921,272
[45] Nov. 25, 1975

[54] BLOWER WHEEL AND METHOD OF MAKING THE SAME

[75] Inventor: Stephen W. Klonoski, Torrington, Conn.

[73] Assignee: Torin Corporation, Torrington, Conn.

[22] Filed: May 24, 1974

[21] Appl. No.: 473,124

[52] U.S. Cl. ............ 29/156.8 CF; 29/513; 416/178; 113/116 D
[51] Int. Cl.² ................. B23P 15/02; B23P 11/00
[58] Field of Search ..... 29/156.8 CF, 513; 416/178, 416/187; 113/116 D

[56] References Cited
UNITED STATES PATENTS

| | | | |
|---|---|---|---|
| 2,155,264 | 4/1939 | Freed | 416/178 |
| 2,980,990 | 4/1961 | Sprouse | 29/156.8 CF |
| 3,262,637 | 7/1966 | Sprouse et al. | 416/178 |
| 3,450,337 | 6/1969 | Jolette | 29/156.8 CF |

Primary Examiner—C. W. Lanham
Assistant Examiner—Dan C. Crane
Attorney, Agent, or Firm—McCormick, Paulding & Huber

[57] ABSTRACT

A blower wheel comprising a sheet metal blade strip in a cylindrical configuration and attached at initially opposite end portions. The blade strip comprises a plurality of circumaxially spaced axially extending fluid moving blades and each blade has axially extending inner and outer edges. The strip also comprises marginal sections which are continuous and formed integrally with end portions of the fluid moving blades. Attachment is accomplished at the marginal sections and may comprise welding. A radial sheet metal member is disposed within and attached to the blade strip with the blades entered respectively in an arcuate series of circumaxially spaced blade receiving openings. The blade receiving openings extend about and embrace the blades from inner to outer edges and a retaining section is disposed outwardly of the blades adjacent the periphery of the member. Notches in the blades straddle edge portions of the blade receiving openings and secure the blades axially with respect to the sheet metal member. The associated method includes formation of the blade strip in flat form and formation of the sheet metal member with blade openings and adjacent portions bent from the plane of the member substantially to enlarge the mouths of the blade openings. Blade strip is rolled about the member, the blades entering the openings and initially opposite but now contiguous end portions of the blade strip are welded together. The bent portions adjacent the blade openings are thereafter rebent simultaneously to the plane of the member whereby to secure the blades radially and axially and to integrate the assembly.

10 Claims, 11 Drawing Figures

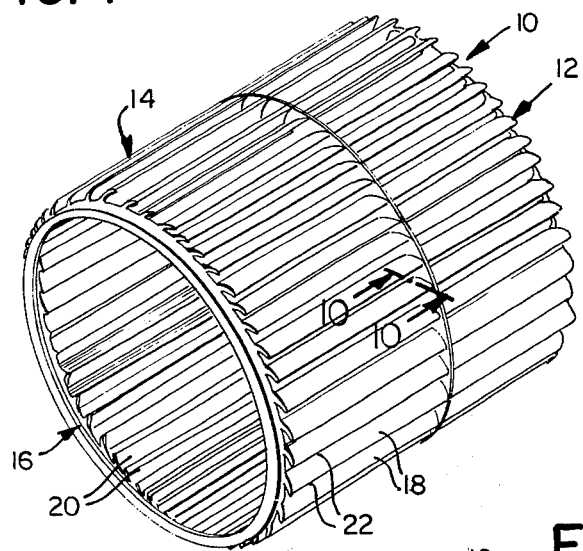
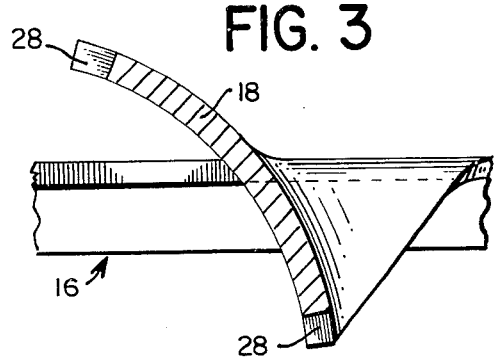
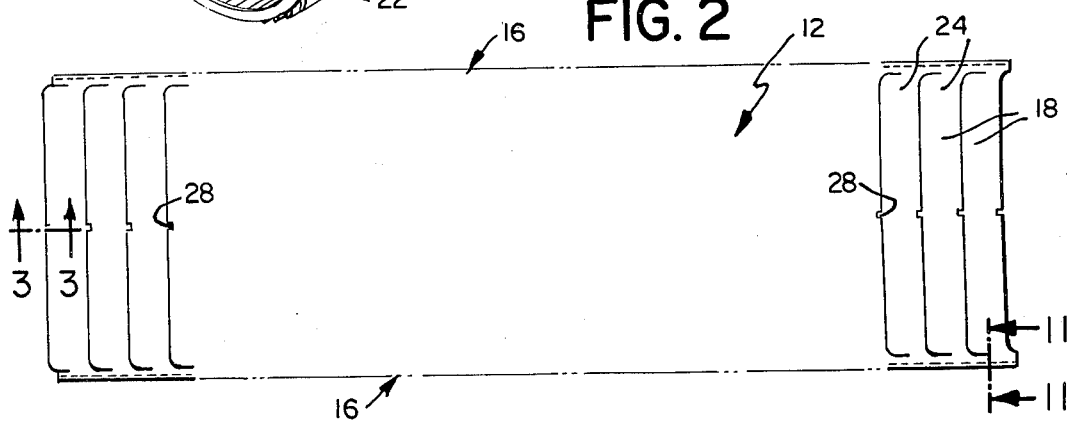
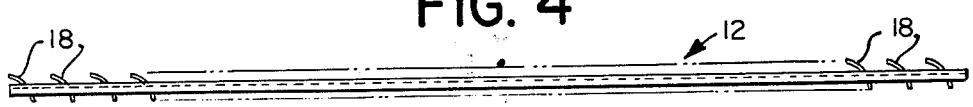
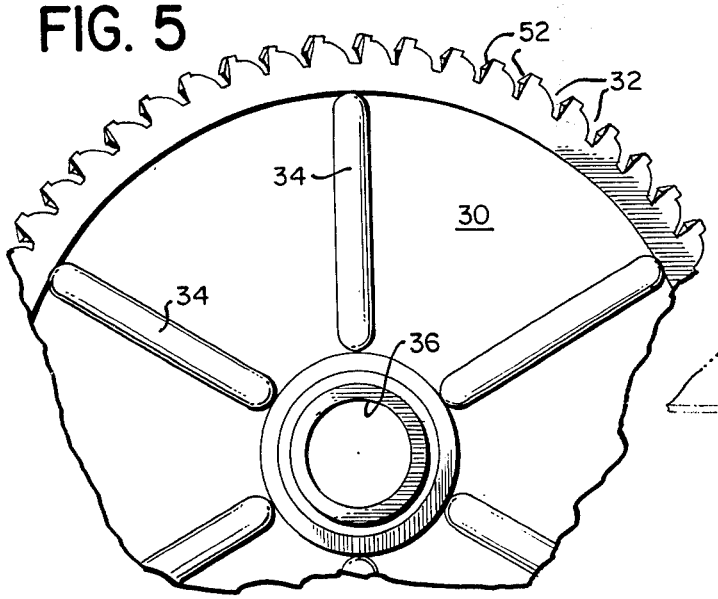
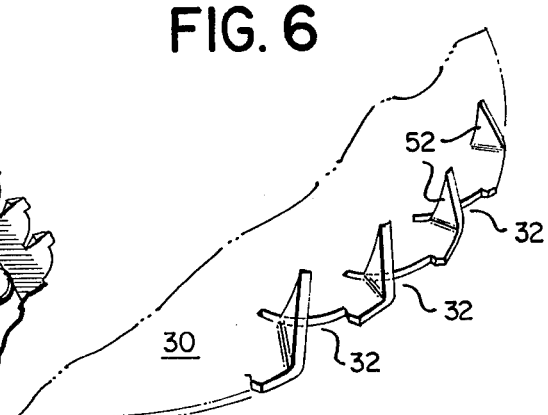

3,921,272

BLOWER WHEEL AND METHOD OF MAKING THE SAME

BACKGROUND OF THE INVENTION

Various types of centrifugal blower wheels and a wide variety of methods of construction have heretofore been employed. Blades have been entered in center plates in notches in the periphery of the latter for locating purposes and even for finally securing the blades in position. Single blade constructions have been employed and blade strip constructions have also been utilized. Separate end ring members have been employed with both individual blade constructions and with blade strip constructions. Despite the extent of development and art in this field, a simple and straight forward assembly method and wheel construction has been lacking.

SUMMARY OF INVENTION

It is the general object of the present invention to provide a desirably simple construction of a blower wheel wherein a high degree of ease and convenience in the method of construction is provided for and yet a high degree of structural integrity results in the retention of blades and center plate or disc against unintended or accidental displacement in either radial or axial directions.

BRIEF DESCRIPTION OF THE DRAWINGS

FIG. 1 is a perspective view of a blower wheel constructed in accordance with the present invention.

FIG. 2 is a plan view of a blower wheel blade strip.

FIG. 3 is an enlarged fragmentary sectional view of a blade taken generally as indicated at 3—3 in FIG. 2.

FIG. 4 is a side view of the blade strip of FIG. 2.

FIG. 5 is an enlarged fragmentary view of the center disc or sheet metal member employed in the blower wheel construction of the present invention.

FIG. 6 is an enlarged fragmentary view of the blower wheel center disc or sheet metal member with small portions thereof adjacent blade receiving openings bent from the plane of the disc, such condition prevailing during a preliminary stage prior to complete assembly.

DESCRIPTION OF PREFERRED EMBODIMENT

Figure 7:
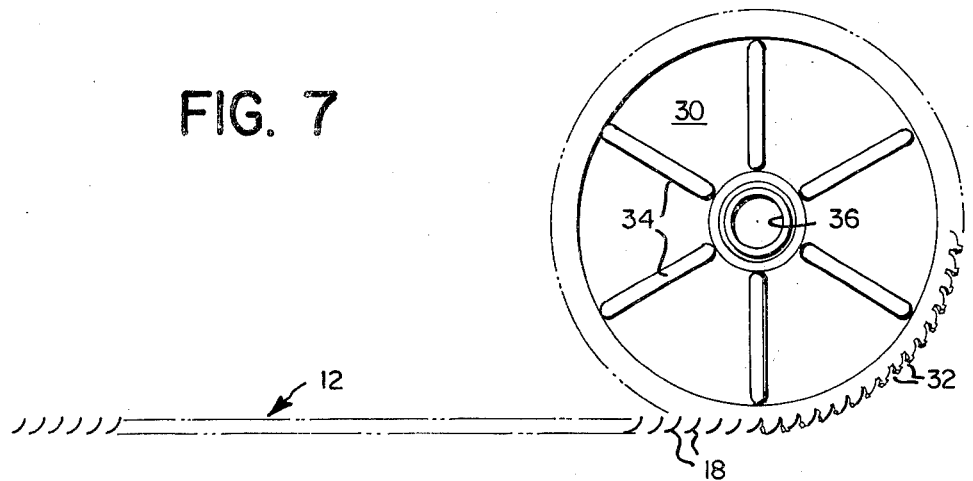
FIG. 7 is a side view of a blower wheel in a partial state of assembly.

Referring particularly to FIG. 1, it will be observed that a blower wheel indicated generally at 10 and constructed in accordance with the present invention comprises a sheet metal blade strip indicated generally at 12 and arranged in a generally cylindrical configuration. The blade strip has an annular intermediate section 14 and opposite narrow annular marginal sections, one indicated at 16. The intermediate section comprises a plurality of circumaxially spaced axially extending fluid moving blades 18, 18. The blades 18, 18, in the presently preferred form take a gradual arcuate cross section viewed transversely, FIG. 3, and in the assembled blower wheel the blades include axially extending inner and outer edges 20, 22 respectively. As illustrated, and in accordance with the presently preferred practice, the inner edges 20, 20 of the blades are disposed radially inwardly of the annular marginal section 16 with a portion of each blade projecting radially inwardly from the latter. The outer edges 22, 22 of the blades are disposed outwardly of the marginal section 16 and the blades project arcuately and generally radially outward beyond said section.

Figure 11:
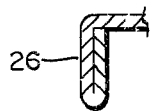
FIG. 11 is an enlarged fragmentary cross sectional view of a marginal portion of the blade strip taken generally as indicated at 11—11 in FIG. 2.

The blower wheel 10 is preferably of blade strip construction as indicated, and inner portions of the annular marginal section 16 are formed integrally with the blades 18, 18, best illustrated in the flat form blade strip of FIG. 2 at 24, 24. The blade strip of FIG. 2 may be formed in a conventional manner with the inner portions of the annular marginal sections integral as illustrated at 24, 24 and with outer portions of said annular marginal sections disposed in a radial plane as best illustrated in FIG. 11. Further, the said outer portions 26 are preferably formed for added strength in double thickness i.e. the said portions are bent back upon themselves as illustrated in FIG. 11. Still further, in the formation of the blade strip, the blades 18, 18 are preferably formed with abutment surfaces which take the form of opposite edges of small notches 28, 28. Notches 28, 28 are preferably formed as best illustrated in FIGS. 2 and 3 to open through axial edges of the blades and said notches are preferably formed at both inner and outer edges 20, 20 and 22, 22. The notches 28, 28 in the blade edges serve a purpose to be set forth more fully hereinbelow.

The second element in the blower wheel of the present invention comprises a sheet metal member of generally radial arrangement with respect to the final assembly and which is conventionally known as a center disc. It is to be understood, however, that the present invention is not limited to a center disc construction and a radial member of sheet metal construction may be attached to a cylindrical blade strip in accordance with the method of the present invention and to assemble a blower wheel of the present invention at an end portion or at both end portions of the wheel etc. Other arrangements are also possible within the contemplation of the invention.

It does fall within the purview and in accordance with the invention to provide a sheet metal member such as 30 with a series of blade receiving openings 32, 32. The openings 32, 32 are arranged in arcuate series and are equally spaced circumaxially and, in the assembled blower, a set of openings are associated respectively with the aforesaid fluid or air moving blades 18, 18. The openings 32, 32 communicate with the periphery of the annular member or disc 30 and may be formed in conventional manufacturing operations. The disc 30 is shown with, in accordance with the presently preferred practice, a plurality of strengthening ribs 34, 34 and with a center opening 36 for mounting on a suitable drive shaft.

Figure 8:
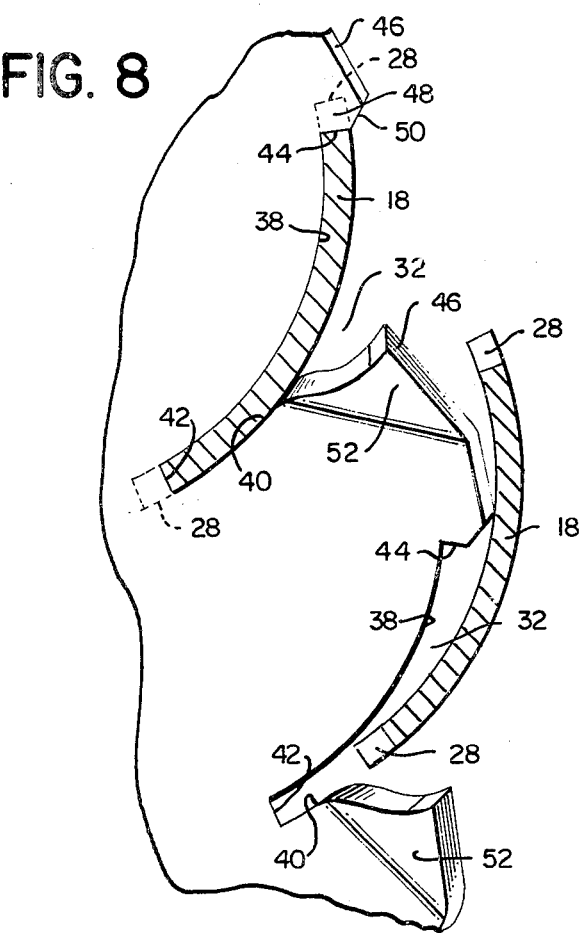
FIG. 8 is an enlarged fragmentary view illustrating a partial state of assembly wherein blades are entering the blade receiving notches in the center disc or sheet metal member.

Referring more particularly to the openings 32, 32 it will be observed, in FIG. 8 that each such opening has opposed side edges 38, 40. When arcuate blades such as the blades 18, 18 are employed, the side edges 38, 40 are formed to take a substantially identical configuration and, as shown, the side edges 38 are concave and the edges 40 convex in configuration. The blade openings 32 also have radially displaced inner and outer edges 42, 44, again best illustrated in FIG. 8, and the outer edge 44, in accordance with the presently preferred practice, is spaced radially inwardly from the periphery 46 of the radial member or disc 30. Thus, a small blade retaining section 48 is provided between the outer end edge 44 of the blade opening 38 and the periphery 46. Said section is shown in FIG. 8 but better illustrated in FIG. 10 wherein a blade 18 is disposed in the blade opening 38 and the outer end edge 44 is in engagement with the blade whereby the retaining section 48 prevents the blade 18 from accidental or unintended radial outward displacement due to centrifugal force in operation of the blower wheel. The retaining section 48 is severed at 50 as illustrated to provide for communication of the blade opening 38 with the periphery of the member 30 and for bending of an adjacent portion 52 of the member 30 as described hereinbelow.

As will be apparent, the adjacent portion 52 of the annular member 30 is disposed at the junction between the edge 40 of an opening 32 and the periphery 46 of the member. That is, contiguous angularly related parts of the edge 40 of the opening 32 and the peripheral edge 46 define a portion 52 and, as illustrated, said portion may take a generally triangular configuration. While a portion of the annular member adjacent to the edge 38 and the peripheral edge 46 may be bent from the plane of the disc or members 30, it is the presently preferred practice to bend a portion such as illustrated at 52 on the convex side of the opening 32 and adjacent the edge 40. In either event, the said portion is preferably bent from the plane of the disc or member 30 through an angle in excess of 45° but less than 90°. Bending of the portions 52, 52 may be accomplished by conventional manufacturing procedures and as best illustrated in FIGS. 5 and 6, each of the portions 52 adjacent each of the openings 32 is bent from the plane of the member 30 at a preliminary stage of construction and prior to the assembly of the member or disc with the blade strip.

Bending of the portions 52, 52 from the plane of the annular member or disc 30 is a critical feature of the present invention and, as will be apparent, the result achieved comprises a considerable widening of the mouth portion of the openings 32, 32. That is, each of the openings 32 during the preliminary stage of construction illustrated in FIGS. 5, 6 and during wheel assembly in FIG. 8, takes a broad generally V-shaped and outwardly facing configuration. Ease and convenience of blade entry to the openings 32 is greatly enhanced and in fact entry of blades to openings of the configuration shown would be impossible without the bending and mouth broadening operation, this being true even if the openings were disposed radially outwardly and the blade retaining sections 48 eliminated. With the bending of the portions 52, 52 it is possible to assemble the blower wheel comprising the member or disc 30 and the blade strip 12 in the manner illustrated in FIG. 7. That is, the blade strip can be rolled or bent about the disc 30 with the blades 18, 18 progressively and sequentially entering the openings 32, 32. FIG. 8 illustrates the manner in which the blades 18, 18 enter the openings 32, 32 and it will be observed that the aforementioned notches 28, 28 straddle and embrace the annular member adjacent the inner and outer end edges 42, 44 of the openings 32. The edges of the notches form abutment surfaces engageable with the member 30 whereby to restrain the blades against unintended or accidental axial movement relative to the member. Following the rolling or bending of the blade strip about the disc 30, initially opposite and assembled contiguous end portions of the marginal sections 24, 26 of the blade strip can be attached together. Welding is a presently preferred attachment method.

Figure 9:
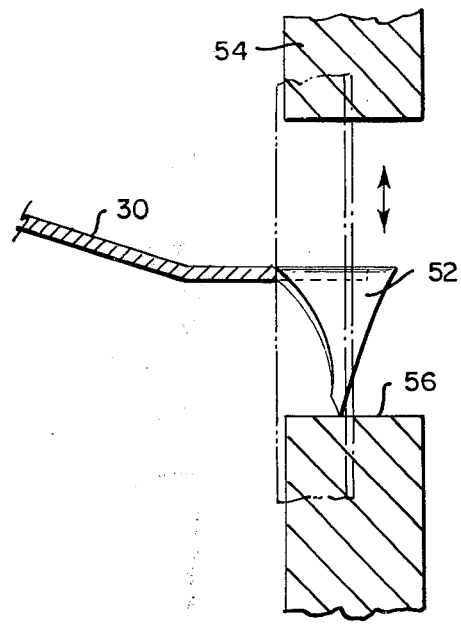
FIG. 9 is a enlarged fragmentary view showing a portion of the center disc or sheet metal member with one of its bent portions engaged by pressing and straightening tools.
Figure 10:
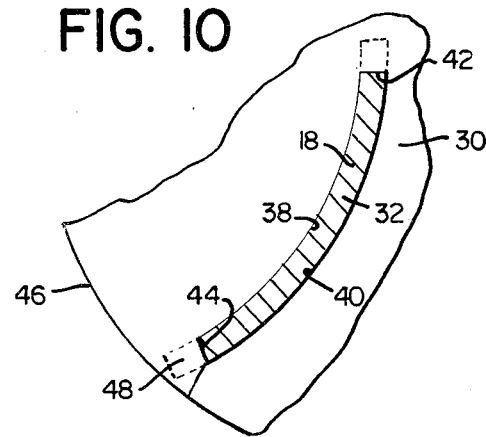
FIG. 10 is an enlarged fragmentary view portion of a center disc with a blade entered and secured in a blade receiving opening.

After attachment of the end portions of the blade strip the portions 52, 52 may be rebent at least approximately to and, preferably, into precise alignment with their original plane. That is, the said portions are rebent to the plane of the member 30. A manner in which rebending is accomplished may vary but it is the presently preferred practice to employ tooling as illustrated generally in FIG. 9. An upper member 54 in FIG. 9 engages and presses downwardly upon the peripheral portions of the disc 30 and movement of the bent portions 52 is obstructed by a lower member 56. Thus, the members 52, 52 may be simultaneously rebent to the plane of the member 30. With the said portions rebent to the plane of the member 30 and as best illustrated in FIG. 10, the blades 18, 18 are locked in position and assembly of the blower wheel is complete. As will be apparent, the side edges 38, 40 of the openings 32 engage and embrace the blades throughout the width of the blades. The invention contemplates that the said side edges embrace the blades throughout at least one half their width and, throughout their entire width in the preferred form shown. The inner and outer end edges 42, 44 of the openings 32 engage the blades and restrain them against inner or outer radial movement. As will be apparent, the retaining section 48 positively prevents the blades from moving radially outwardly. The aforementioned notches 28, 28 provide at their side edges for positive axial retention of the blades as aforesaid. Thus, a high degree of structural integrity is achieved in a final assembly of the blower wheel and yet ease and convenience of manufacture is enhanced. Blower wheels of the present invention may be manufactured at economic advantage with a single center disc as compared with double discs in many constructions and without separate end rings. Further, a high degree of structural integrity is provided and a desirably simple construction results and exhibits improved dependability and durability in operation.

I claim:

1. A method of making a blower wheel comprising the steps of providing an elongated blade strip including a longitudinally extending intermediate section and similar and opposite longitudinally extending narrow marginal sections, said intermediate section comprising a plurality of longitudinally spaced transversely extending similarly angularly inclined fluid moving blades, and said longitudinally extending marginal sections of said strip including continuous transversely inwardly disposed portions formed integrally with end portions of said fluid moving blades, providing a circular sheet metal member with an arcuate series of circumaxially spaced blade receiving openings communicating with its peripheral edge, each of said openings having an adjacent corner portion of said member which includes contiguous angularly related parts of an opening edge and said peripheral edge bent out of the plane of the member whereby substantially to enlarge the mouth of the opening and a major portion of its length, bending said blade strip about said circular member whereby respectively to enter said fluid moving blades in said enlarged blade receiving openings and thereby to form said strip to a cylindrical configuration with initially opposite end portions of said marginal sections in contiguous relationship, attaching together said contiguous end portions of said narrow marginal sections of the blade strip, and rebending said bent portions of said circular member at least approximately to the plane of said member whereby to secure said blades in their respective openings and to attach said member to said blade strip.

2. A method of making a blower wheel as set forth in claim 1 wherein each of said adjacent portions of said sheet metal member is bent from the plane thereof so as to extend approximately half way between radially displaced inner and outer edges of its associated blade receiving openings and thus to provide a broad generally V-shaped configuration at the mouth of the opening for ease of blade entry.

3. A method of making a blower wheel as set forth in claim 1 wherein said step of providing a circular sheet metal member comprises the subsidiary steps of first providing a circular sheet metal member and thereafter providing said blade receiving openings at its peripheral edge, said latter step including the formation of blade receiving openings having configurations substantially identical with the transverse cross sectional configurations of the blades.

4. A method of making a blower wheel as set forth in claim 3 wherein said step of forming said blade receiving openings includes the formation of a blade retaining section between a main portion of each said openings and the periphery of the sheet metal member, said blade retaining sections being severed to provide communication between their respective openings and the periphery of the sheet metal member and to permit bending and rebending of said contiguous angularly related parts as aforesaid.

5. A method of making a blower wheel as set forth in claim 4 wherein said step of providing said blade strip includes the formation of air moving blades with gradual arcuate transverse cross sections, and wherein said blade receiving openings are provided of like configuration.

6. A method of making a blower wheel as set forth in claim 4 wherein said step of providing said blade strip includes the formation of at least one small axial blade retaining notch in at least some of said blades, each of said blade notches opening through a blade edge and being so positioned with the blower wheel assembled as to have side edges thereof disposed adjacent and substantially in engagement with said circular sheet metal member and in straddling and axial blade retaining relationship with an end edge of a corresponding blade receiving opening therein.

7. A method of making a blower wheel as set forth in claim 6 wherein each of said blades is formed with a pair of retaining notches at opposite edges thereof, said notch edges with the blower wheel assembled being disposed in straddling and axial blade retaining relationship as aforesaid respectively adjacent and about inner and outer end edges of the respective blade openings.

8. A method of making a blower wheel as set forth in claim 2 wherein each of said adjacent portions of said sheet metal member is bent through an angle in excess of 45° from the plane of the member.

9. A method of making a blower wheel as set forth in claim 8 wherein each of said adjacent portions of said sheet metal member is bent through an angle less than 90°.

10. A method of making a blower wheel as set forth in claim 9 wherein said rebending of said bent portions is accomplished simultaneously by pressing on a side of said member opposite said bent portions and concurrently obstructing movement of said portions.

* * * * *